(12) United States Patent
Frisen

(10) Patent No.: US 10,099,522 B2
(45) Date of Patent: Oct. 16, 2018

(54) TIRE REMOVAL ASSEMBLY

(71) Applicant: Peter Frisen, Drayton (CA)

(72) Inventor: Peter Frisen, Drayton (CA)

(*) Notice: Subject to any disclaimer, the term of this patent is extended or adjusted under 35 U.S.C. 154(b) by 312 days.

(21) Appl. No.: 15/006,246

(22) Filed: Jan. 26, 2016

(65) Prior Publication Data

US 2017/0210186 A1    Jul. 27, 2017

(51) Int. Cl.
*B60C 25/13* (2006.01)
*B60C 25/02* (2006.01)

(52) U.S. Cl.
CPC .............. *B60C 25/13* (2013.01); *B60C 25/02* (2013.01)

(58) Field of Classification Search
CPC ..... B60C 25/13; B60C 25/132; B60C 25/135; B60C 25/02
See application file for complete search history.

(56) References Cited

U.S. PATENT DOCUMENTS

| | | | |
|---|---|---|---|
| 1,667,351 A | 4/1928 | Levitt | |
| 2,581,569 A | 1/1952 | Zugaro | |
| 4,133,363 A * | 1/1979 | Gardner | B60C 25/132 157/1.3 |
| 4,804,030 A * | 2/1989 | Mandelko | B60C 25/132 157/1.17 |
| 4,969,498 A * | 11/1990 | Sheets | B60C 25/025 157/1.17 |
| 6,305,453 B1 * | 10/2001 | Zielewicz | B60C 25/128 157/1.1 |
| 8,276,641 B2 | 10/2012 | Matteucci | |
| 2006/0151121 A1 * | 7/2006 | Baker | B60C 25/13 157/1.17 |
| 2008/0289772 A1 * | 11/2008 | Reeves, Jr. | B60C 25/138 157/1.1 |
| 2015/0298515 A1 * | 10/2015 | Malenfant | B60C 25/02 157/1.28 |

* cited by examiner

*Primary Examiner* — David B Thomas

(57) ABSTRACT

A tire removal assembly includes a press that has a base and an actuator. The base may be positioned on a support surface and the actuator is spaced from the base. The actuator may be fluidly coupled to an air source thereby facilitating the actuator to move downwardly with respect to the base. The actuator is biased to move upwardly with respect to the base. The press may have a tire positioned between the base and the actuator thereby facilitating the actuator to engage the tire such that the actuator breaks a bead on the tire.

10 Claims, 6 Drawing Sheets

TIRE REMOVAL ASSEMBLY

BACKGROUND OF THE DISCLOSURE

Field of the Disclosure

The disclosure relates to tire removal devices and more particularly pertains to a new tire removal device for removing a tire from a rim.

SUMMARY OF THE DISCLOSURE

An embodiment of the disclosure meets the needs presented above by generally comprising a press that has a base and an actuator. The base may be positioned on a support surface and the actuator is spaced from the base. The actuator may be fluidly coupled to an air source thereby facilitating the actuator to move downwardly with respect to the base. The actuator is biased to move upwardly with respect to the base. The press may have a tire positioned between the base and the actuator thereby facilitating the actuator to engage the tire such that the actuator breaks a bead on the tire.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
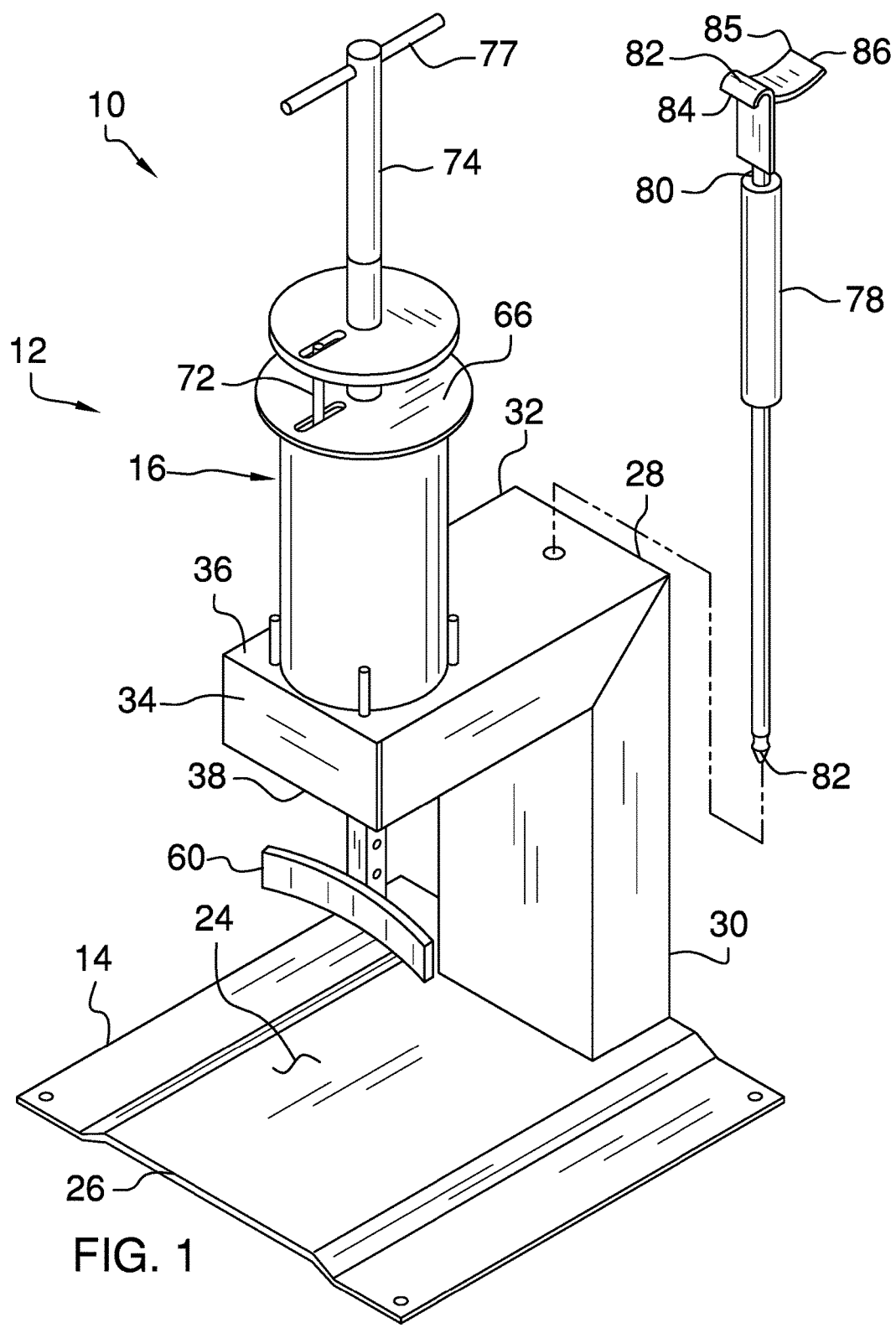
FIG. 1 is a front perspective view of a tire removal assembly according to an embodiment of the disclosure.
Figure 2:
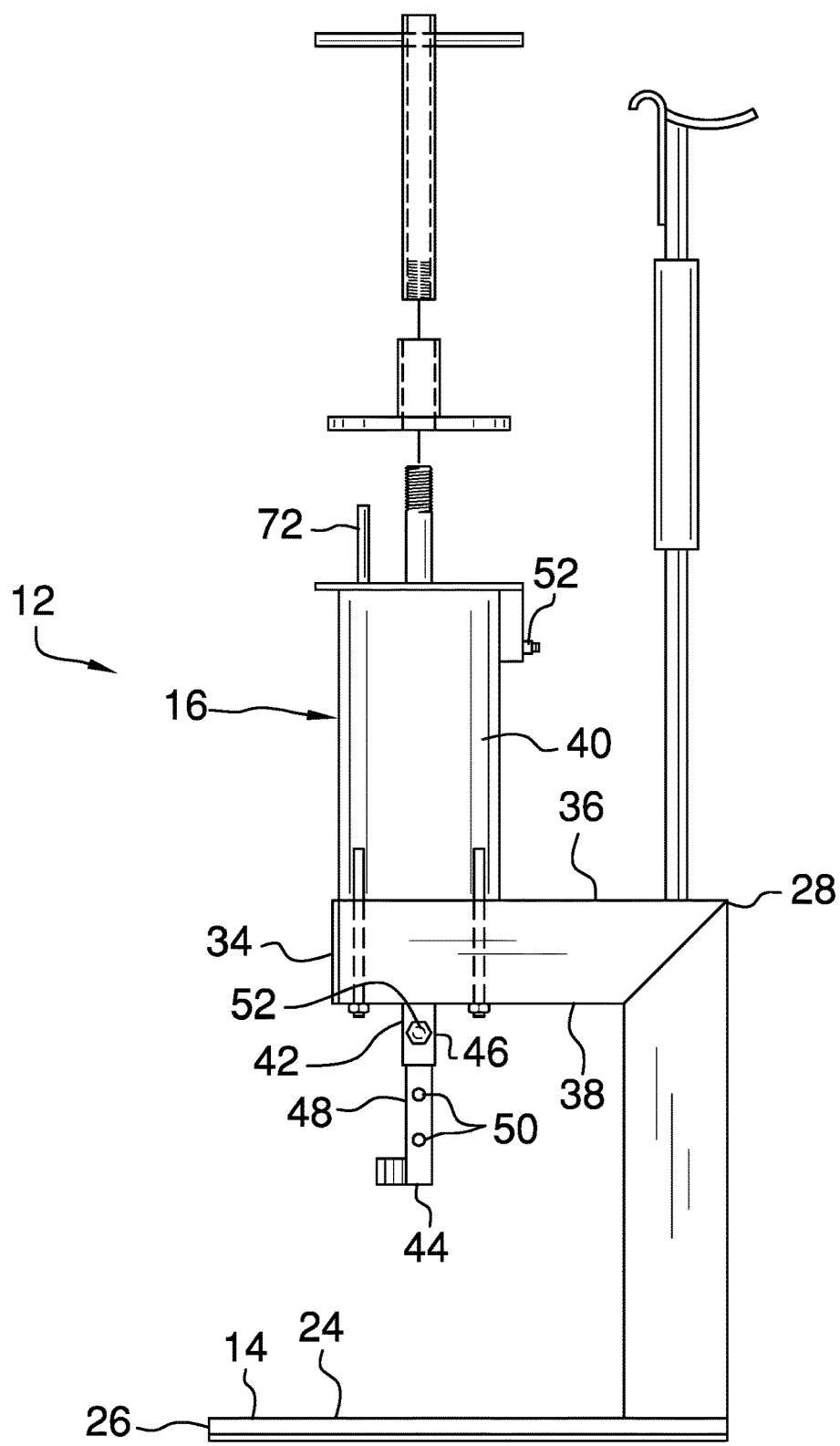
FIG. 2 is a left side exploded view of an embodiment of the disclosure.
Figure 3:
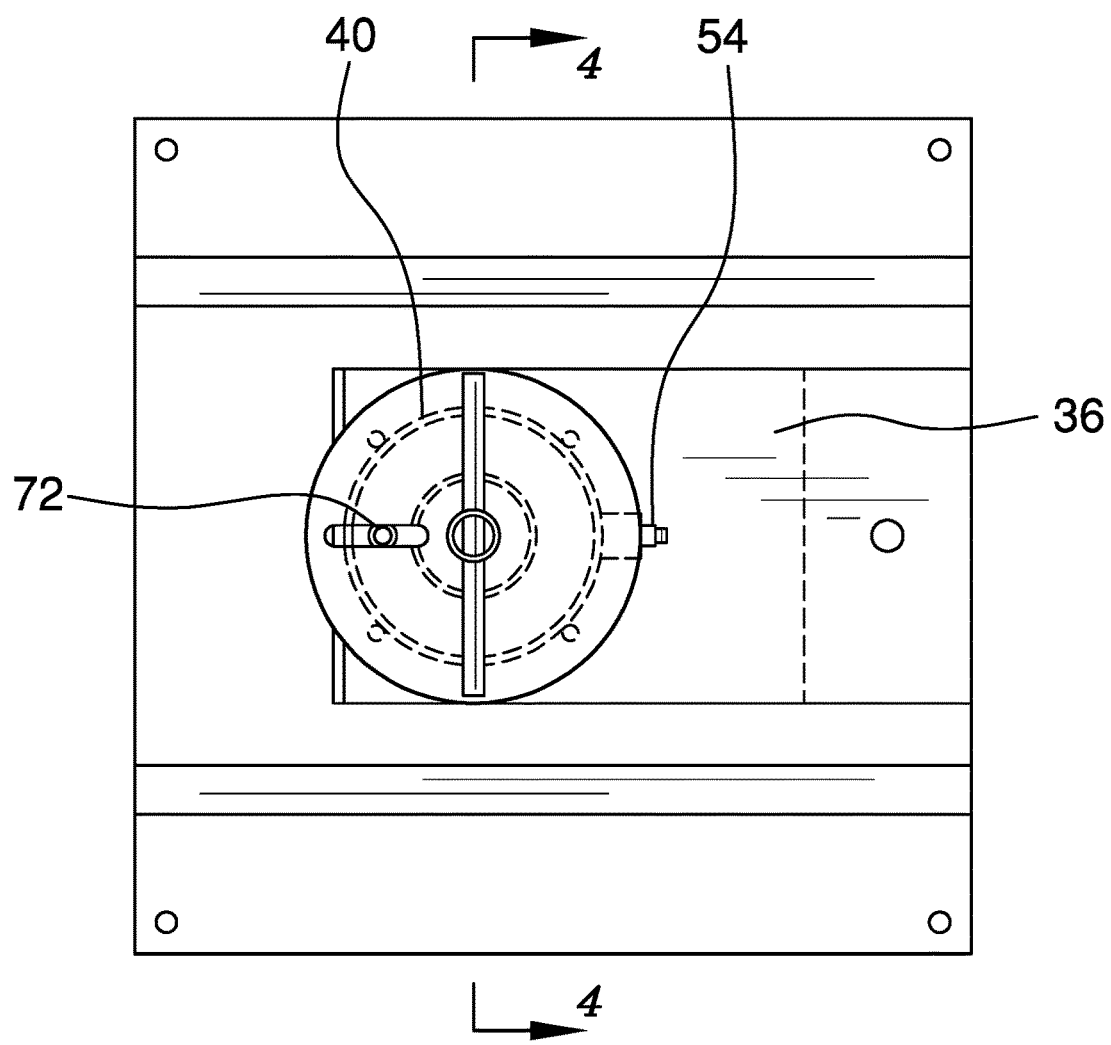
FIG. 3 is a top phantom view of an embodiment of the disclosure.
Figure 4:
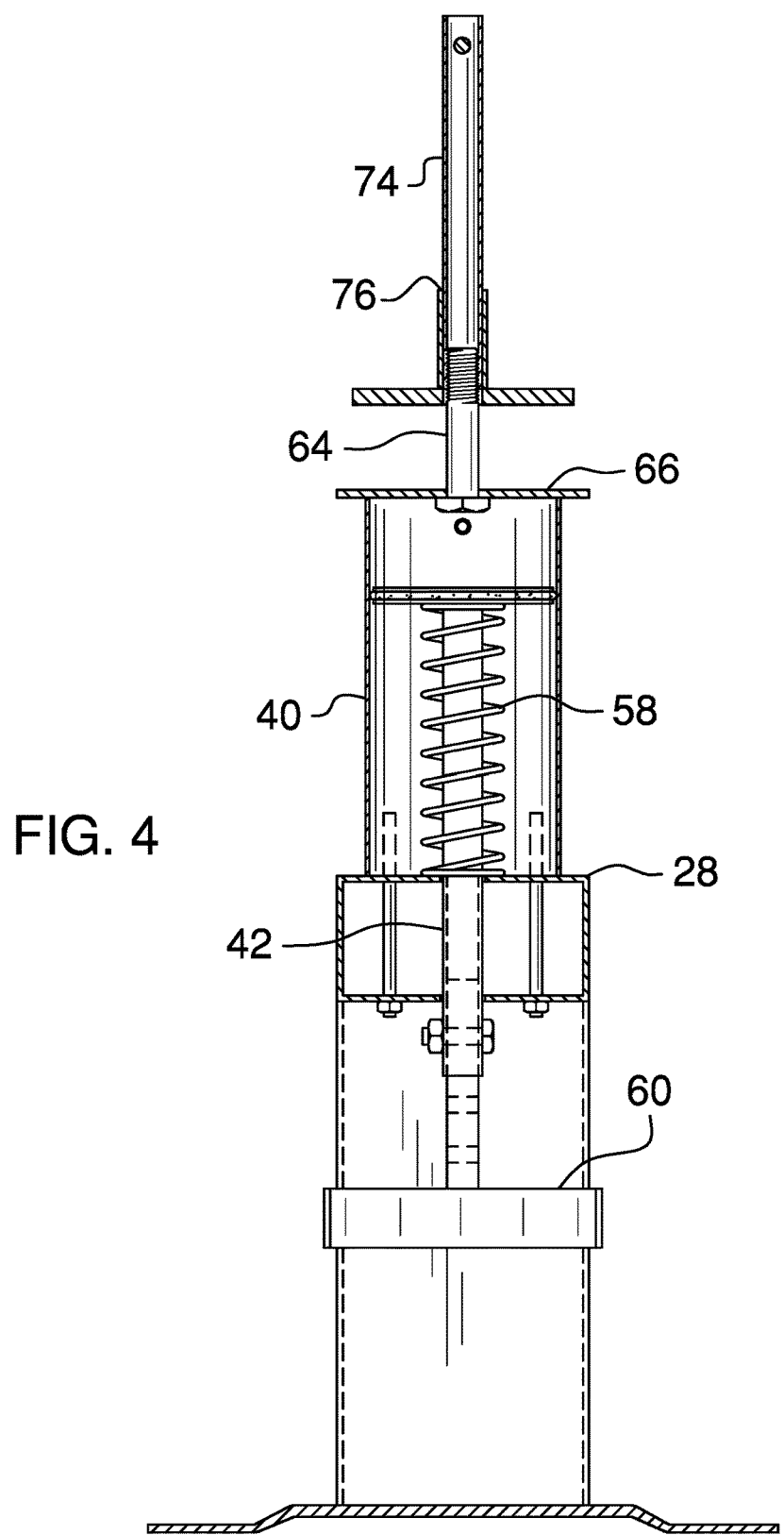
FIG. 4 is a cross sectional view taken along line 4-4 of FIG. 3 of an embodiment of the disclosure.
Figure 5:
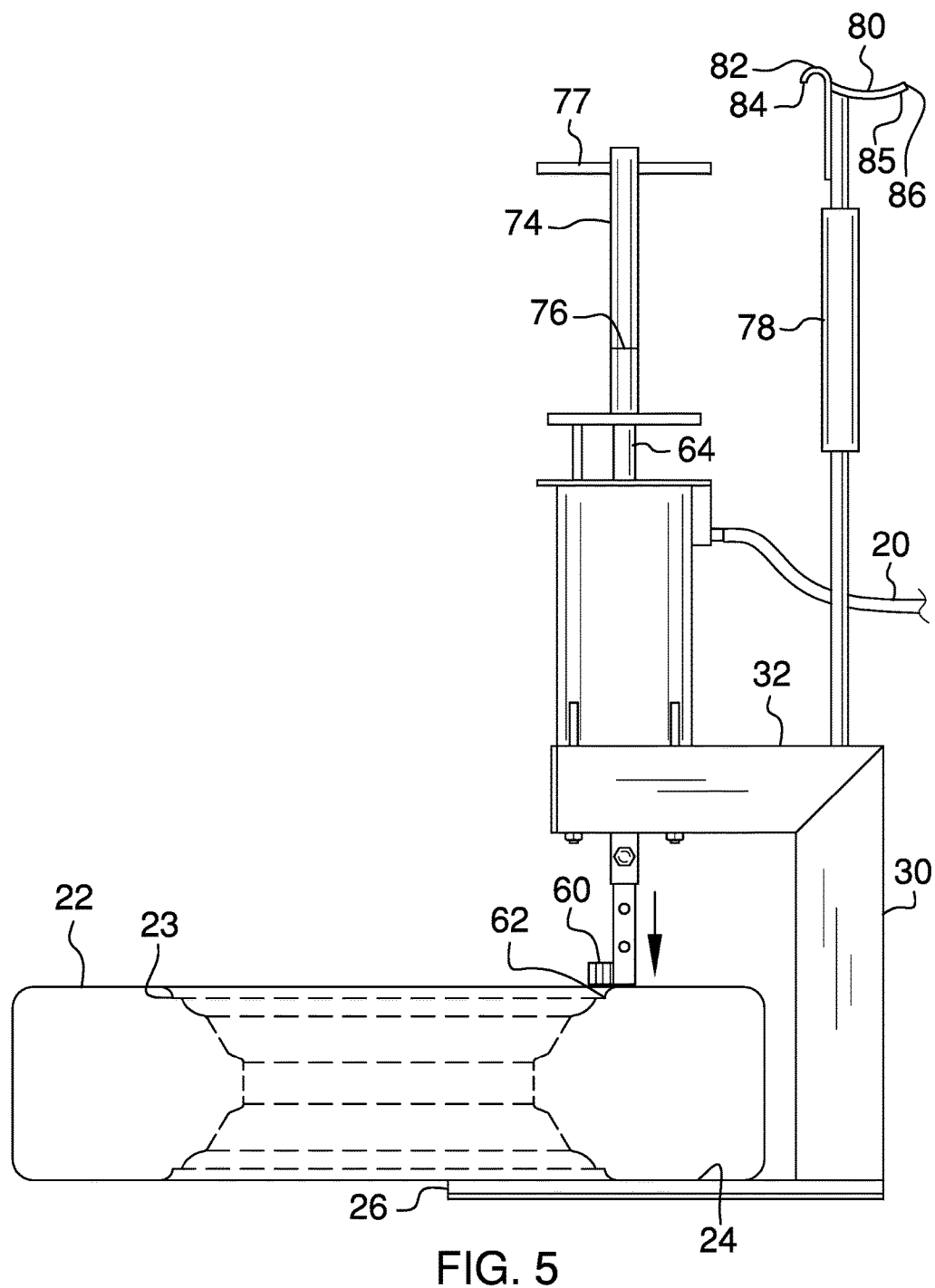
FIG. 5 is a perspective in-use view of an embodiment of the disclosure.
Figure 6:
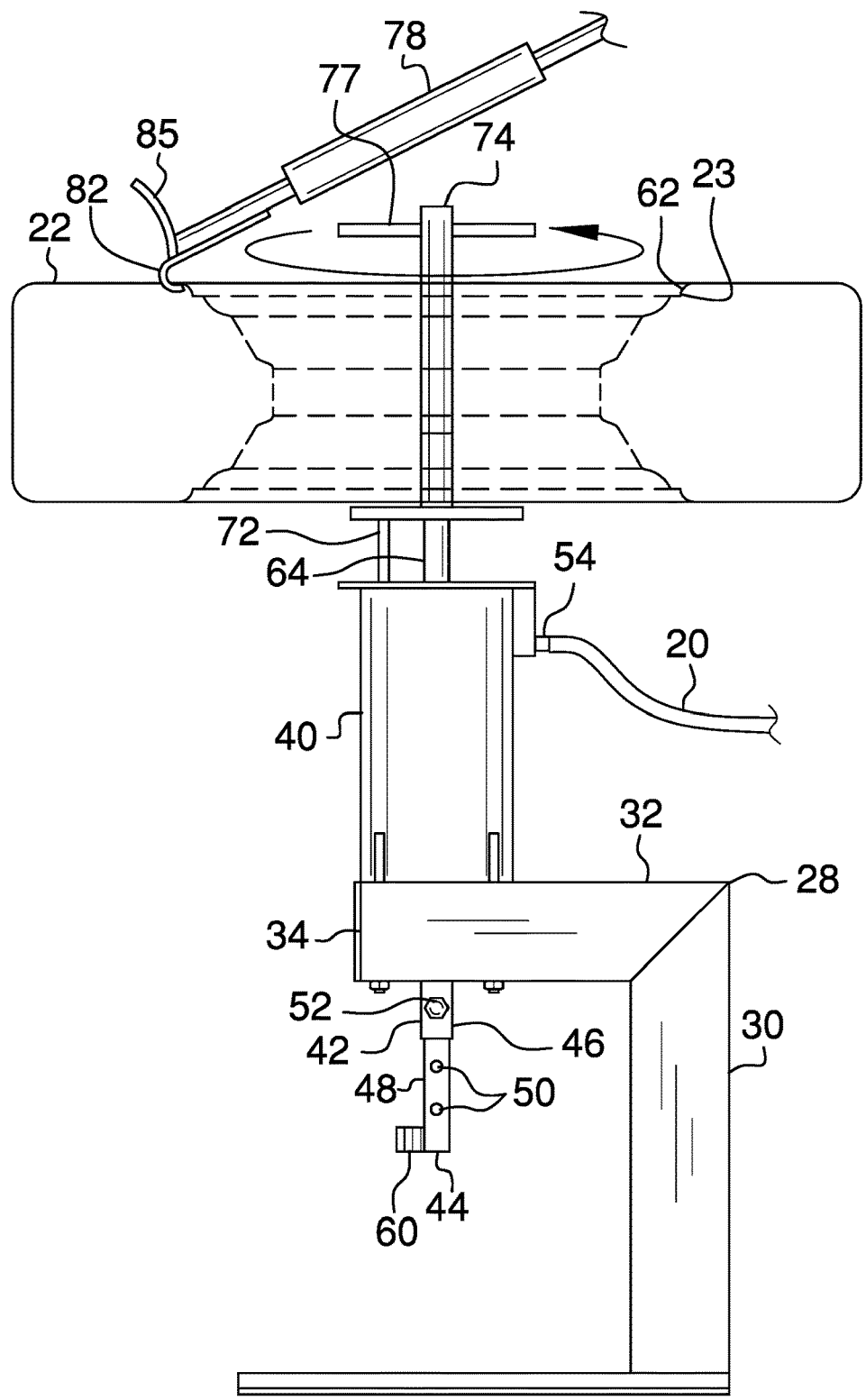
FIG. 6 is a side perspective in-use view of an embodiment of the disclosure.

With reference now to the drawings, and in particular to FIGS. 1 through 6 thereof, a new tire removal device embodying the principles and concepts of an embodiment of the disclosure and generally designated by the reference numeral 10 will be described.

As best illustrated in FIGS. 1 through 6, the tire removal assembly 10 generally comprises a press 12 that has a base 14 and an actuator 16. The base 14 may be positioned on a support surface 18. The support surface 18 may be a floor or the like. The actuator 16 is spaced from the base 14. The actuator 16 may be fluidly coupled to an air source 20 thereby facilitating the actuator 16 to move downwardly with respect to the base 14. The press 12 may have a tire 22 positioned between the base 14 and the actuator 16. Thus, the actuator 16 may engage the tire 22 such that the actuator 16 breaks a bead on the tire 22. The tire 22 may be a vehicle tire or the like and the tire 22 may be mounted on a rim 23.

The base 14 has a top surface 24 and a front edge 26. The press 12 includes a mount 28 that has a first arm 30 directed away from a second arm 32. The first arm 30 is coupled to and extends upwardly from the top surface 24 and the second arm 32 is spaced from the base 14. The second arm 32 has a distal end 34 with respect to the first arm 30. The distal end 34 is directed toward the front edge 26. The second arm 32 has a top side 36 and a bottom side 38.

The actuator 16 comprises a piston 40 that is coupled to and extends upwardly from the top side 36. The piston 40 includes a rod 42 and the rod 42 extends downwardly through the second arm 32. The piston 40 may comprise an air actuated piston or the like. The rod 42 has a distal end 44 with respect to the piston 40.

The rod 42 comprises an upper half 46 that is slidably coupled to a bottom half 48. The bottom half 48 has a plurality of apertures 50 extending therethrough. The apertures 50 are spaced apart from each other and distributed along the bottom half 48. A bolt 52 extends through the upper half 46 and engaging a selected one of the apertures 50. Thus, the rod 42 has a telescopically adjustable length.

An air port 54 is coupled to the piston 40 and the air port 54 is in fluid communication with an interior of the piston 40. The air port 54 may be fluidly coupled to the air source 20. The air source 20 may be an air hose or the like. Thus, the rod 42 may be selectively urged downwardly with respect to the piston 40. A biasing member 58 is positioned within the piston 40. The biasing member 58 engages the rod 42. Thus, the biasing member 58 biases the rod 42 upwardly in the piston 40 when the air port 54 is uncoupled from the air source 20.

A plate 60 is coupled to the distal end 44 of the rod 42 and the plate 60 is oriented transverse with respect to the rod 42. The plate 60 is curved along a lateral axis. Thus, the plate 60 may coextensively engage an inner edge 62 of the tire 22. The plate 60 urges the inner edge 62 away from the rim 23 when the rod 42 is urged downwardly. Thus, the bead is broken on the tire 22.

A shaft 64 is coupled to and extends upwardly from a top end 66 of the piston 40. The shaft 64 is centrally positioned on the piston 40. The shaft 64 has a distal end 68 with respect to the piston 40. A disk 70 is positioned on the shaft 64 and the disk 70 is spaced from the top end 66. The shaft 64 extends upwardly through the disk 70. The tire 22 may be placed on the disk 70 when the bead is broken.

A pin 72 is coupled to and extends upwardly from the top end 66. The pin 72 engages the disk 70 such that the pin 72 inhibits the disk 70 from rotating on the shaft 64. A handle 74 is removably coupled to the distal end 76 of the shaft 64. The handle 74 has a grip 77 that is oriented transverse to the handle 74. The grip 77 is spaced above the tire 22 when the tire 22 is positioned on the disk 70.

A pry bar 78 is provided that has a first end 80 and a second end 81. A hook 82 is coupled to the first end 80 such that an end 84 of the hook 82 is directed toward the second end 81. The pry bar 78 may be manipulated such that the hook 82 engages the inner edge 62 of the tire 22. Thus, the pry bar 78 may remove the inner edge 62 from the rim 23. A tab 85 is coupled to and extends away from the hook 82. The tab 85 is oriented perpendicular to the pry bar 78. The tab 85 is curved between the hook 82 and an end 86 of the tab 85. The pry bar 78 may be stored in a well 88 that extends into the mount 28.

In use, the tire 22 is positioned on the top surface 24 of the base 14. The tire 22 manipulated to align the inner edge 62 of the tire 22 with the plate 60. The air port 54 is fluidly coupled to the air source 20 and the piston 40 is urged downwardly. The plate 60 engages the inner edge 62 of the tire 22 and breaks the bead on the tire 22. The air port 54 is uncoupled from the air source 20 and the piston 40 is biased upwardly. The tire 22 is removed from the base 14 and the tire 22 is positioned on the disk 70. The pry bar 78 is manipulated to remove the tire 22 from the rim 23.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tire removal assembly comprising:
a press having a base and an actuator, said base being configured to be positioned on a support surface, said actuator being spaced from said base, said actuator being configured to be fluidly coupled to an air source thereby facilitating said actuator to move downwardly with respect to said base, said actuator being biased to move upwardly with respect to said base, said press being configured to have a tire positioned between said base and said actuator thereby facilitating said actuator to engage the tire such that said actuator breaks a bead on the tire, said base having a top surface and a front edge, said press including a mount having a first arm being directed away from a second arm, said first arm being coupled to and extending upwardly from said top surface, said second arm being spaced from said base, said second arm having a distal end with respect to said first arm, said distal end being directed toward said front edge, said second arm having a top side and a bottom side.

2. The assembly according to claim 1, wherein said actuator comprises a piston being coupled to and extending upwardly from said top side, said piston including a rod, said rod extending downwardly through said second arm, said rod having a distal end with respect to said piston, said rod comprising an upper half being slidably coupled to a bottom half, said bottom half having a plurality of apertures extending therethrough, said apertures being spaced apart from each other and distributed along said bottom half.

3. The assembly according to claim 2, further comprising a bolt extending through said upper half and engaging a selected one of said apertures such that said rod has a telescopically adjustable length.

4. The assembly according to claim 2, further comprising an air port being coupled to said piston such that said air port is in fluid communication with an interior of said piston, said air port being configured to be fluidly coupled to the air source thereby facilitating said rod to be selectively urged downwardly with respect to said piston.

5. The assembly according to claim 2, further comprising a biasing member being positioned within said piston, said biasing member engaging said rod such that said biasing member biases said rod upwardly in said piston when said piston is uncoupled from the air source.

6. The assembly according to claim 2, further comprising a plate being coupled to said distal end of said rod, said plate being oriented transverse with respect to said rod, said plate being curved along a lateral axis wherein said plate is configured to coextensively engage an inner edge of the tire, said plate being configure to urge the inner edge away from a rim when said rod is urged downwardly.

7. The assembly according to claim 1, further comprising a pry bar having a first end and a second end, said pry bar including a hook being coupled to said first end such that an end of said hook is directed toward said second end, said pry bar being configured to be manipulated having said hook engaging the inner edge of the tire thereby facilitating said pry bar to remove the inner edge from the rim.

8. A tire removal assembly comprising:
a press having a base and an actuator, said base being configured to be positioned on a support surface, said actuator being spaced from said base, said actuator being configured to be fluidly coupled to an air source thereby facilitating said actuator to move downwardly with respect to said base, said actuator being biased to move upwardly with respect to said base, said press being configured to have a tire positioned between said base and said actuator thereby facilitating said actuator to engage the tire such that said actuator breaks a bead on the tire;
a shaft being coupled to and extending upwardly from a top end of said piston, said shaft being centrally positioned on said piston, said shaft having a distal end with respect to said piston;
a disk being positioned on said shaft such that said disk is spaced from said top end, said shaft extending upwardly through said disk, said disk being configured to have the tire placed thereon; and
a pin being coupled to and extending upwardly from said top end, said pin engaging said disk such that said pin inhibits said disk from rotating on said shaft.

9. The assembly according to claim 8, further comprising a handle being removably coupled to said distal end of said shaft, said handle having a grip being oriented transverse to said handle, said grip being configured to be spaced above the tire when the tire is positioned on said disk.

10. A tire removal assembly comprising:
a press having a base and an actuator, said base being configured to be positioned on a support surface, said actuator being spaced from said base, said actuator being configured to be fluidly coupled to an air source thereby facilitating said actuator to move upwardly and downwardly with respect to said base, said press being configured to have a tire positioned between said base and said actuator thereby facilitating said actuator to engage the tire such that said actuator breaks a bead on the tire, said base having a top surface and a front edge, said press including a mount having a first arm being directed away from a second arm, said first arm being coupled to and extending upwardly from said top surface, said second arm being spaced from said base, said second arm having a distal end with respect to said first arm, said distal end being directed toward said front edge, said second arm having a top side and a bottom side, said actuator comprising:

a piston being coupled to and extending upwardly from said top side, said piston including a rod, said rod extending downwardly through said second arm, said rod having a distal end with respect to said piston, said rod comprising an upper half being slidably coupled to a bottom half, said bottom half having a plurality of apertures extending therethrough, said apertures being spaced apart from each other and distributed along said bottom half, a bolt extending through said upper half and engaging a selected one of said apertures such that said rod has a telescopically adjustable length, an air port being coupled to said piston such that said air port is in fluid communication with an interior of said piston, said air port being configured to be fluidly coupled to the air source thereby facilitating said rod to be selectively urged downwardly with respect to said piston, a biasing member being positioned within said piston, said biasing member engaging said rod such that said biasing member biases said rod upwardly in said piston when said air port is uncoupled from the air source, a plate being coupled to said distal end of said rod, said plate being oriented transverse with respect to said rod, said plate being curved along a lateral axis wherein said plate is configured to coextensively engage an inner edge of the tire, said plate being configure to urge the inner edge away from a rim when said rod is urged downwardly, a shaft being coupled to and extending upwardly from a top end of said piston, said shaft being centrally positioned on said piston, said shaft having a distal end with respect to said piston, a disk being positioned on said shaft such that said disk is spaced from said top end, said shaft extending upwardly through said disk, said disk being configured to have the tire placed thereon, a pin being coupled to and extending upwardly from said top end, said pin engaging said disk such that said pin inhibits said disk from rotating on said shaft, and a handle being removably coupled to said distal end of said shaft said handle having a grip being oriented transverse to said handle, said grip being configured to be spaced above the tire when the tire is positioned on said disk; and a pry bar having a first end and a second end, said pry bar including a hook being coupled to said first end such that an end of said hook is directed toward said second end, said pry bar being configured to be manipulated having said hook engaging the inner edge of the tire thereby facilitating said pry bar to remove the inner edge from the rim.

* * * * *